(12) United States Patent
You et al.

(10) Patent No.: US 11,762,931 B2
(45) Date of Patent: Sep. 19, 2023

(54) FEEDBACK METHOD AND APPARATUS BASED ON ONLINE DOCUMENT COMMENT, AND NON-TRANSITORY COMPUTER-READABLE STORAGE MEDIUM

(71) Applicant: BEIJING BYTEDANCE NETWORK TECHNOLOGY CO., LTD., Beijing (CN)

(72) Inventors: Chaocai You, Beijing (CN); Longteng Peng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/749,294

(22) Filed: May 20, 2022

(65) Prior Publication Data

US 2022/0277055 A1 Sep. 1, 2022

Related U.S. Application Data

(63) Continuation of application No. PCT/CN2020/128164, filed on Nov. 11, 2020.

(30) Foreign Application Priority Data

Nov. 20, 2019 (CN) .......................... 201911140444.4

(51) Int. Cl.
*G06F 16/9536* (2019.01)
*G06F 16/93* (2019.01)
(Continued)

(52) U.S. Cl.
CPC .......... *G06F 16/9536* (2019.01); *G06F 16/93* (2019.01); *G06F 16/9538* (2019.01); *H04L 67/55* (2022.05)

(58) Field of Classification Search
None
See application file for complete search history.

(56) References Cited

U.S. PATENT DOCUMENTS

| 5,671,428 A * | 9/1997 | Muranaga | G06Q 10/10 |
| | | | 715/201 |
| 6,687,878 B1 * | 2/2004 | Eintracht | H04L 51/216 |
| | | | 715/201 |

(Continued)

FOREIGN PATENT DOCUMENTS

| CN | 101923563 A | 12/2010 |
| CN | 103034722 A | 4/2013 |

(Continued)

OTHER PUBLICATIONS

International Search Report dated Feb. 18, 2021 in International Application No. PCT/CN2020/128164.

(Continued)

*Primary Examiner* — Mark D Featherstone
*Assistant Examiner* — Navneet Gmahl

(57) ABSTRACT

Provided are a feedback method and apparatus based on an online document comment, and a non-transitory computer-readable storage medium. The feedback method based on an online document comment includes receiving comment push information sent by a server, where the comment push information is generated by the server according to a comment feedback addition request sent by a terminal and includes a document identifier, a comment identifier, and a comment feedback type; determining a first target document matching the document identifier and determining a first comment matching the comment identifier in the first target document; and acquiring comment feedback matching the comment feedback type and adding the comment feedback in a comment feedback display region matching the first comment.

16 Claims, 4 Drawing Sheets

(51) Int. Cl.
*G06F 16/9538* (2019.01)
*H04L 67/55* (2022.01)

(56) References Cited

U.S. PATENT DOCUMENTS

| | | | |
|---|---|---|---|
| 6,865,713 B1 | 3/2005 | Bates et al. | |
| 2004/0122843 A1* | 6/2004 | Terris | G06F 40/117 707/999.102 |
| 2010/0313114 A1* | 12/2010 | Colbran | G06F 40/169 715/230 |
| 2011/0154192 A1* | 6/2011 | Yang | G06F 40/171 715/256 |
| 2011/0178981 A1* | 7/2011 | Bowen | G06Q 10/00 707/E17.008 |
| 2011/0264653 A1* | 10/2011 | Cierniak | G06F 16/958 707/723 |
| 2013/0091465 A1* | 4/2013 | Kikin-Gil | G06F 3/04847 715/817 |
| 2013/0097481 A1* | 4/2013 | Kotler | G06F 16/34 715/230 |
| 2013/0218884 A1 | 8/2013 | McConnell et al. | |
| 2014/0032500 A1 | 1/2014 | Wibbeler et al. | |
| 2014/0033013 A1 | 1/2014 | Shaver | |
| 2014/0207703 A1* | 7/2014 | Huang | G06Q 30/0282 705/347 |
| 2014/0280542 A1* | 9/2014 | Pridmore | H04L 67/131 709/204 |
| 2014/0365886 A1* | 12/2014 | Koenig | G06F 3/04855 715/711 |
| 2015/0058957 A1* | 2/2015 | Halliday | G06F 3/04817 726/7 |
| 2015/0135300 A1* | 5/2015 | Ford | G06Q 50/18 726/11 |
| 2015/0248480 A1* | 9/2015 | Miller | G06Q 10/101 707/723 |
| 2015/0293926 A1* | 10/2015 | Yang | H04W 4/029 707/610 |
| 2016/0019195 A1 | 1/2016 | Sultanik et al. | |
| 2016/0041973 A1* | 2/2016 | Beckley | G06F 16/93 707/608 |
| 2016/0092957 A1* | 3/2016 | Maezawa | G06F 16/9554 705/26.61 |
| 2016/0155091 A1* | 6/2016 | Arndorfer | G06Q 10/101 705/300 |
| 2016/0173467 A1* | 6/2016 | Pasupuleti | G06Q 10/101 726/5 |
| 2017/0091208 A1* | 3/2017 | Quan | G06F 16/00 |
| 2017/0255604 A1* | 9/2017 | Wilde | G06Q 10/103 |
| 2018/0025084 A1 | 1/2018 | Conlan et al. | |
| 2018/0032493 A1* | 2/2018 | Raleigh | G06Q 10/101 |
| 2018/0182001 A1* | 6/2018 | Ghoshal | G06Q 30/0282 |
| 2018/0218625 A1* | 8/2018 | Ragade | H04L 51/216 |
| 2018/0246983 A1* | 8/2018 | Rathod | G06F 16/9566 |
| 2018/0253412 A1* | 9/2018 | Biswas | H04L 65/4015 |
| 2018/0254068 A1* | 9/2018 | Kulkarni | H04N 21/458 |
| 2018/0268932 A1* | 9/2018 | Shinkichi | G16H 40/20 |
| 2019/0132275 A1* | 5/2019 | Kelly | H04L 65/611 |
| 2019/0158550 A1* | 5/2019 | Wilde | G06Q 10/101 |
| 2019/0385051 A1* | 12/2019 | Wabgaonkar | G06N 3/084 |
| 2020/0293608 A1* | 9/2020 | Nelson | G06F 40/169 |
| 2020/0311191 A1* | 10/2020 | Sekine | G06Q 10/103 |
| 2021/0027007 A1* | 1/2021 | Peng | G06F 3/04817 |
| 2021/0027249 A1* | 1/2021 | Ken-Dror | G06Q 10/103 |
| 2022/0083727 A1* | 3/2022 | Theodore | G06F 40/169 |
| 2022/0277055 A1* | 9/2022 | You | G06F 40/169 |

FOREIGN PATENT DOCUMENTS

| | | |
|---|---|---|
| CN | 104090969 A | 10/2014 |
| CN | 104639423 A | 5/2015 |
| CN | 104796487 A | 7/2015 |
| CN | 105227447 A | 1/2016 |
| CN | 105787125 A | 7/2016 |
| CN | 105872653 A | 8/2016 |
| CN | 107147680 A | 9/2017 |
| CN | 107577684 A | 1/2018 |
| CN | 107832276 A | 3/2018 |
| CN | 108470057 A | 8/2018 |
| CN | 108595646 A | 9/2018 |
| CN | 108604155 A | 9/2018 |
| CN | 108885616 A | 11/2018 |
| CN | 108984516 A | 12/2018 |
| CN | 109634489 A | 4/2019 |
| CN | 109688479 A | 4/2019 |
| CN | 110866193 A | 3/2020 |
| JP | 2002163220 A | 6/2002 |
| JP | 2007025393 A | 2/2007 |
| JP | 2014241113 A | 12/2014 |
| WO | 2017161769 A1 | 9/2017 |
| WO | 2018006575 A1 | 1/2018 |
| WO | 2018122642 A1 | 7/2018 |
| WO | 2012056552 A1 | 5/2021 |

OTHER PUBLICATIONS

First Search for prior Chinese Patent Application No. 201911140444.4.
Extended European Search Report dated Nov. 28, 2022 in European Application No. 20889150.7.
CN Search Report dated Mar. 27, 2023 in CN Appl. No. 201911140444.4, English translation (13 pages).
Chen, et al., Research and Application of Information Push in Mobile OA, 2014, 35(12), 30-35, English Translation of Abstract only.
Ying, et al., Research of Long Connection Cloud Push Service based on Android Plat form, 1007-9767- (2017) 18-044-04, English Translation of Abstract only.
Office Action dated Aug. 1, 2023 in Japanese Application No. 2022-529402, with English translation (8 pages).

* cited by examiner

FEEDBACK METHOD AND APPARATUS BASED ON ONLINE DOCUMENT COMMENT, AND NON-TRANSITORY COMPUTER-READABLE STORAGE MEDIUM

CROSS-REFERENCE TO RELATED APPLICATIONS

This is a continuation of International Patent Application No. PCT/CN2020/128164, filed on Nov. 11, 2020, which claims priority to Chinese Patent Application No. 201911140444.4 filed on Nov. 20, 2019, the disclosures of which are incorporated herein by reference in their entireties.

TECHNICAL FIELD

The present disclosure relates to the field of Internet communication technologies, for example, a feedback method and apparatus based on an online document comment, and a non-transitory computer-readable storage medium.

BACKGROUND

With the development of Internet technology, the online document is used increasingly frequently, and more and more users start to use the online document to record work or edit documents.

After the users use the online document to record work or write a document, they can share the document to others for viewing, and others may comment on the content of the online document, for example, asking questions about the content of a document, giving praise to the content of a document, or the like.

Regarding the preceding manners of commenting on the content of the online document, the users cannot quickly determine which comment information is useful or which comment information is useless. Only after the users have read the comment information, can they make a determination. Therefore, high-quality comment content cannot be accurately and quickly screened out from lots of comment information.

SUMMARY

The present disclosure provides a feedback method and apparatus based on an online document comment, and a non-transitory computer-readable storage medium, to feed back on a comment in an online document and send feedback content to each opened online document page in real time, thereby enhancing interaction feedback between users and helping the users screen out the comment effectively.

A feedback method based on an online document comment is provided and includes the steps described below.

Comment push information sent by a server is received, where the comment push information is generated by the server according to a comment feedback addition request sent by a terminal and includes a document identifier, a comment identifier, and a comment feedback type.

A first target document matching the document identifier is determined and the first target document is searched for a first comment matching the comment identifier.

Comment feedback matching the comment feedback type is acquired and added in a comment feedback display region matching the first comment.

A feedback method based on an online document comment is further provided and includes steps described below.

A comment feedback addition request sent by a terminal is acquired, where the comment feedback addition request is generated according to a selection of a target comment impression option in at least two candidate comment impression options displayed in the terminal.

In the case where it is determined that the comment feedback addition request passes verification, comment push information matching the comment feedback addition request is generated, where the comment push information includes a document identifier, a comment identifier, and a comment feedback type.

The comment push information is sent to at least one terminal that opens a target document matching the document identifier.

A feedback apparatus based on an online document comment is further provided and includes at least one processor; and a memory configured to store at least one program, wherein the at least one program, when executed by the at least one processor, causes the at least one processor to perform: receiving comment push information sent by a server, where the comment push information is generated by the server according to a comment feedback addition request sent by a terminal and includes a document identifier, a comment identifier, and a comment feedback type; determining a first target document matching the document identifier and search the first target document for a first comment matching the comment identifier; acquiring comment feedback matching the comment feedback type and add the comment feedback in a comment feedback display region matching the first comment.

A feedback apparatus based on an online document comment is further provided and includes at least one processor; and a memory configured to store at least one program, wherein the at least one program, when executed by the at least one processor, causes the at least one processor to perform the feedback method based on an online document comment described above which includes that a comment feedback addition request sent by a terminal is acquired, where the comment feedback addition request is generated according to a selection of a target comment impression option in at least two candidate comment impression options displayed in the terminal; in the case where it is determined that the comment feedback addition request passes verification, comment push information matching the comment feedback addition request is generated, where the comment push information includes a document identifier, a comment identifier, and a comment feedback type; and the comment push information is sent to at least one terminal that opens a target document matching the document identifier.

A non-transitory computer-readable storage medium is further provided. The computer-readable storage medium stores a computer program, where the computer program, when executed by a processor, performs the feedback method based on an online document comment described above.

DETAILED DESCRIPTION

The present disclosure is described below in conjunction with drawings and embodiments.

Embodiment One

Figure 1:
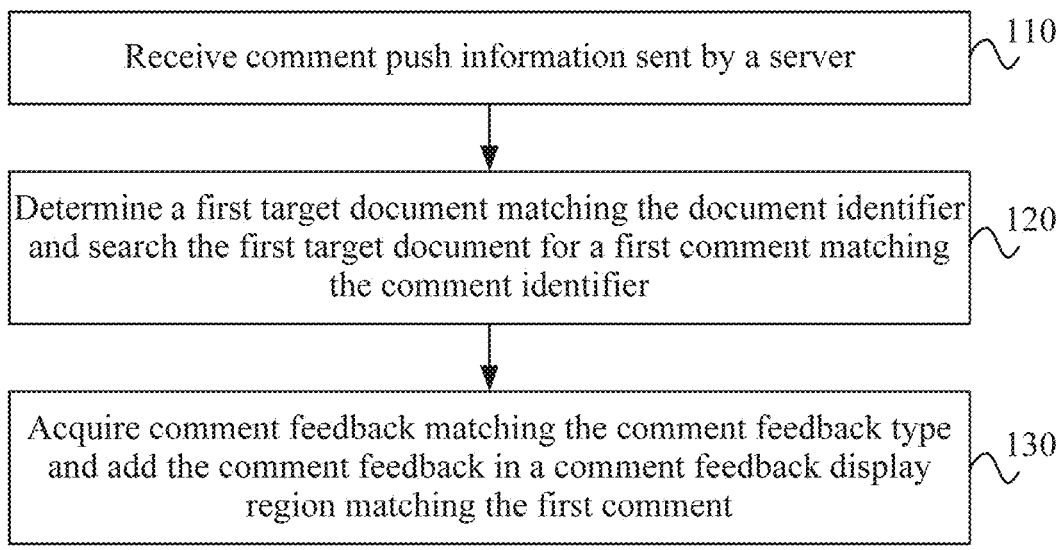
FIG. 1 is a flowchart of a feedback method based on an online document comment according to embodiment one of the present disclosure.

FIG. 1 is a flowchart of a feedback method based on an online document comment according to embodiment one of the present disclosure. The embodiment of the present disclosure may be applicable to the case of performing a feedback on a specified comment on a target document and displaying feedback content. The method may be performed by a feedback apparatus based on an online document comment. The apparatus may be implemented by software and/or hardware and may be configured in an electronic device such as a terminal device. As shown in FIG. 1, the method includes the steps described below.

In step 110, comment push information sent by a server is received.

In the embodiment of the present disclosure, the comment push information is generated by the server according to a comment feedback addition request sent by any terminal and may instruct the terminal device to display feedback content for a comment on a corresponding online document page, and the comment push information may include a document identifier, a comment identifier, and a comment feedback type.

The document identifier is used for distinguishing different documents, and each document corresponds to a unique document identifier. The comment identifier is used for distinguishing multiple comments in a same document or distinguishing multiple comments in different documents. Multiple comment feedback types may be provided and correspond to various preset emoticons and pictures respectively. For example, a like emoticon type corresponds to a "like" emoticon, an applause picture type corresponds to an "applause" picture, and so on.

In the embodiment of the present disclosure, the comment push information received by the terminal may be generated according to the comment feedback addition request sent by the terminal itself, that is, the comment push information reflects the feedback content of a target comment by a native user; or the comment push information may be generated according to the comment feedback addition request sent by other terminal devices, that is, the comment push information reflects the feedback content of the target comment by users of other terminals. In this manner, the feedback of the target comment on the target document on multiple terminals may be updated simultaneously.

In the embodiment of the present disclosure, the method may further include that in response to a comment impression feedback request for a third comment in a second target document, a comment feedback addition request corresponding to a preset comment feedback is generated and the comment feedback addition request corresponding to the preset comment feedback is sent to the server; or in response to the comment impression feedback request for the third comment in the second target document, at least two candidate comment impression options are displayed, and in response to a selection of a target comment impression option, a comment feedback addition request matching the target comment impression option is generated and sent to the server; where the server is configured to generate the comment push information according to the comment feedback addition request and send the comment push information to at least one terminal that opens the second target document currently.

The second target document to which comment feedback is to be added and a document corresponding to the received comment push information may be the same document or different documents. The native user feeds back on the third comment in the second target document to generate the comment impression feedback request for the third comment, and the users of other terminals may also feed back on the third comment in the second target document.

Exemplarily, assuming that the third comment in the second target document W is "a physical meaning of a formula A is not clearly explained and the formula A actually represents the slope of a tangent of a curve C", when the user wants to feed back on the third comment in the document W opened on the terminal, the user clicks on a feedback button corresponding to the third comment, and the comment feedback addition request corresponding to the preset comment feedback, such as a comment feedback addition request corresponding to the "like" emoticon, is generated and sent to the server. If the user wants to select other comment feedback, the user moves a mouse on the feedback button for a period of time, such as 2 seconds, to generate the comment impression feedback request for the third comment, and the terminal responds to the comment impression feedback request and displays to the user at least two preset candidate comment impression options, such as the "like" emoticon, the "applause" emoticon, a "disagreeing" picture and "invaluable advice" text graphics. When the user clicks on a corresponding candidate comment impression option, such as the "applause" emoticon, a comment feedback addition request matching the "applause" emoticon is generated and sent to the server so that the server performs corresponding feedback permission verification on the comment feedback addition request, and after the verification is passed, corresponding comment push information is generated and sent to all terminals that open the document W currently.

The comment is fed back by using emoticons, pictures and the like so that an attitude of the user towards the comment content may be expressed, and other comment feedback with different opinions or a substantive feedback opinion may not be submerged in feedback without substantive content, that is, not only the communication between the users can be increased, but also the users can be enabled to quickly acquire valuable comment feedback content.

In an embodiment, before the at least two candidate comment impression options are displayed in response to the comment impression feedback request for the third comment in the second target document, the method further includes that the second target document is opened in response to an open request for the second target document; and a communication establishment request carrying a second target document identifier is sent to the server to establish a target communication link with the server, and a target communication link identifier corresponding to the second target document identifier returned by the server is received.

In the embodiment of the present disclosure, when the user performs an opening operation, such as a double-click operation, on the second target document, an open request for the second target document is generated, and the terminal opens the second target document according to the request and displays the content of the second target document. Then the terminal acquires the document identifier of the second target document, generates the communication establishment request carrying the second target document identifier, sends the communication establishment request to the server to establish the target communication link with the server, and receives the target communication link identifier corresponding to the second target document identifier returned by the server so that information exchange between the terminal and the server is achieved subsequently through the target communication link identifier.

In an embodiment, the step in which the comment feedback addition request matching the target comment impression option is generated and sent to the server may include that the comment feedback addition request is sent to the server through a communication link corresponding to the target communication link identifier.

In the embodiment of the present disclosure, since the target communication link for the information exchange is established between the terminal and the server, after the user performs a feedback operation on the target comment in the target document opened on the terminal and the comment feedback addition request matching the target comment impression option is generated, the comment feedback addition request may be sent to the server through the communication link corresponding to the target communication link identifier.

In step S120, a first target document matching the document identifier is determined and the first target document is searched for a first comment matching the comment identifier.

In the embodiment of the present disclosure, one or more documents may be opened on the terminal. After the comment push information sent by the server is received, first, the document identifier and the comment identifier are extracted from the comment push information, and then the document identifier is matched with the document identifier of at least one currently opened document. If the first target document matching the document identifier in the comment push information is found, then comment identifiers of multiple comments are acquired continuously from the first target document, and the comment identifier in the comment push information is matched with the multiple comment identifiers in the first target comment, to search the first target document for the first comment matching the comment identifier in the comment push information.

In step S130, comment feedback matching the comment feedback type is acquired and added in a comment feedback display region matching the first comment.

In the embodiment of the present disclosure, the comment feedback type matches a type of the candidate comment impression option. Exemplarily, for the candidate comment impression option "like" emoticon, the corresponding comment feedback type is the like emoticon, that is, according to the comment feedback type, the corresponding comment feedback content may be clearly found from the preset candidate comment impression options.

In an embodiment, the comment feedback display region is located at a preset position in a first comment region of the first comment or located at a preset position outside the first comment region.

In the embodiment of the present disclosure, each comment has a corresponding comment region, and the comment feedback display region may be a rectangular region at a specified orientation in the first comment region or a square region at a specified orientation outside the first comment region. The specified orientation may include a left side, a lower side, an upper left side or the like. A shape of the comment feedback display region is not limited to a rectangle and a square and may also be a parallelogram and other shapes. The shape of the comment feedback display region and a positional relationship between the comment feedback display region and the first comment region are not limited in the embodiment of the present disclosure.

In an embodiment, after the comment feedback is added in the comment feedback display region matching the first comment, the method may further include that in response to a comment request of a user, a second comment is generated; where the second comment and the first comment correspond to a same commented content, and a second comment region where the second comment is located and the comment feedback display region are located in different regions.

In the embodiment of the present disclosure, the second comment may be a text comment or an emoticon comment corresponding to the same commented content as the first comment. Different display regions are assigned to the second comment region and the comment feedback display region corresponding to the first comment so that comment feedback of each user on the first comment can be clearly differentiated from other comments, which is convenient to quickly positioning comment feedback corresponding to a specified comment in the document.

In an embodiment, the second comment region where the second comment is located and the comment feedback display region being located in different regions may include that the comment feedback display region is located between the first comment region and the second comment region; or the second comment region is immediately adjacent to one side of the first comment region, and the comment feedback display region is immediately adjacent to another side of the first comment region.

In the embodiment of the present disclosure, in the case where multiple comments on the same commented content exist, the multiple comments may be arranged horizontally or vertically according to a time sequence of the comments. For the first comment and the second comment whose comment time is adjacent, the comment feedback display region of the first comment may be set between the first comment region and the second comment region, or the second comment region is immediately adjacent to one side of the first comment region, such as a lower side or an upper side of the first comment region, and the comment feedback display region is immediately adjacent to a left side or a right side of the first comment region.

In an embodiment, the step in which the comment feedback is added in the comment feedback display region matching the first comment may include that the comment feedback type is acquired and whether comment feedback of this type already exists in the comment feedback display region is determined; if the comment feedback of this type already exists in the comment feedback display region, a number of pieces of comment feedback is updated in the comment feedback display region; and if the comment feedback of this type does not exist in the comment feedback display region, the comment feedback is added in the comment feedback display region.

Exemplarily, assuming that the comment type of the comment feedback is the "applause" emoticon, whether the "applause" emoticon already exists in the comment feedback display region is determined firstly. If the "applause" emoticon already exists, one is added to the number of emoticons corresponding to the "applause" emoticon; and if the "applause" emoticon does not exist in the comment feedback display region, the "applause" emoticon is displayed in the comment feedback display region. The advantages of this setting are: listing multiple pieces of identical comment feedback one by one and occupying a relatively large display page are avoided, a variety of comment feedback for one comment may be displayed intuitively, and comment feedback with the real content is avoided from being submerged in a large number of pieces of similar or identical comment feedback.

In an embodiment, the comment feedback is an emoticon icon and/or an emoticon icon and a name of a commenter.

In the embodiment of the present disclosure, in a display manner of the comment feedback, only an emoticon icon selected by the user, for example, a "received" emoticon may be displayed, or the emoticon icon and a name of the user who feeds back the emoticon icon, for example, an AAI "received" emoticon may be displayed simultaneously. Of course, a display form of the comment feedback is not limited in the embodiment of the present disclosure.

In the embodiment of the present disclosure, the comment push information sent by the server is received, the first target document and the first comment matching the comment push information are determined, and the comment feedback matching the comment feedback type in the comment push information is added in the comment feedback display region matching the first comment so that valid feedback in a form of an emoticon, a picture and the like is performed on the comments in the online document, the display of multiple pieces of repetitive or similar comment feedback is avoided in a same document, and high-quality comment feedback with substantial content is easily acquired by the user and not be submerged by low-quality comment feedback, that is, a display ratio of repetitive and low-quality comment feedback in the online document is reduced, high-quality comments are screened out for the user, and communication between the users is enhanced.

Embodiment Two

Figure 2:
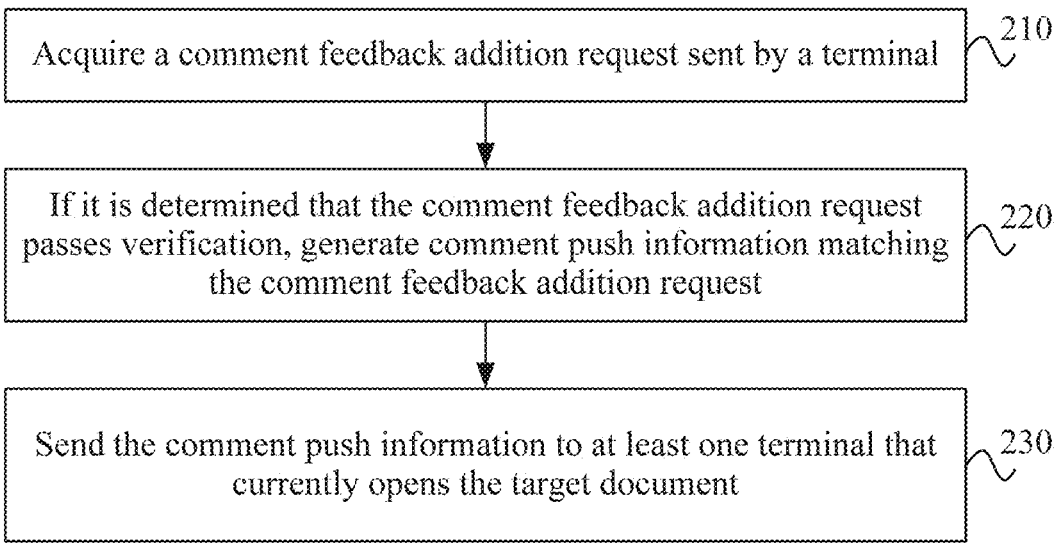
FIG. 2 is a flowchart of another feedback method based on an online document comment according to embodiment two of the present disclosure.

FIG. 2 is a flowchart of another feedback method based on an online document comment according to embodiment two of the present disclosure. The embodiment of the present disclosure may be applicable to the case of performing verification on a target comment feedback of a target document sent by a terminal and pushing the feedback content that passes the verification to all terminals that open the target document. The method may be performed by a feedback apparatus based on an online document comment. The apparatus may be implemented by software and/or hardware and may be configured in an electronic device such as a server. As shown in FIG. 2, the method includes the steps described below.

In step 210, a comment feedback addition request sent by a terminal is acquired.

In the embodiment of the present disclosure, the comment feedback addition request is generated according to a selection of a target comment impression option in at least two candidate comment impression options displayed in the terminal.

In an embodiment, before the comment feedback addition request sent by the terminal is acquired, the method may further include that a communication establishment request carrying the document identifier sent by the terminal is received; a target communication link is established with the terminal according to the communication establishment request; and a target communication link identifier corresponding to the target communication link is sent to the terminal.

In the embodiment of the present disclosure, the communication establishment request carrying the document identifier sent by the terminal is generated after the terminal opens the target document and acquires the document identifier of the target document. After the server establishes the target communication link with the terminal, the server sends the target communication link identifier corresponding to the target communication link to the terminal so that information exchange with the terminal may be performed subsequently through the target communication link.

In an embodiment, the step in which the comment feedback addition request sent by the terminal is acquired may include that the comment feedback addition request sent by the terminal through the target communication link is acquired.

In the embodiment of the present disclosure, after the target communication link identifier is sent to the terminal and the terminal generates the comment feedback addition request matching the target comment impression option, the terminal may send the comment feedback addition request to the server through the communication link corresponding to the target communication link identifier.

In step 220, if it is determined that the comment feedback addition request passes verification, comment push information matching the comment feedback addition request is generated.

In the embodiment of the present disclosure, the comment push information may include a document identifier, a comment identifier, and a comment feedback type. The comment feedback addition request may include a target document identifier, a target comment identifier, a target user identifier, and a target comment feedback type. The target user refers to a user who wants to perform comment feedback on the target comment in the target document, that is, an author of feedback content, and the target user identifier is used for distinguishing this user from other users. Since different users have different feedback permissions for the target comment in the target document, one user identifier needs to be set for each user to determine a feedback permission of the user for each comment in each document.

In an embodiment, the step in which it is determined that the comment feedback addition request passes the verification may include that a target user identifier in the comment feedback addition request is compared with a valid user identifier list; and if the valid user identifier list includes the target user identifier, the verification is passed, and if the valid user identifier list does not include the target user identifier, the verification fails.

In the embodiment of the present disclosure, to control that only the user with the permission can perform feedback on the target comment, one valid user identifier list is preset for each document or each comment in each document and used for limiting which users may perform the feedback on the comment. When the server performs permission verification on the comment feedback addition request, the valid user identifier list corresponding to the target comment identifier in the comment feedback addition request may be acquired first, and then compares the target user identifier in the comment feedback addition request with the valid user identifier list. If the valid user identifier list includes the target user identifier, it is considered that the verification is passed, and the comment feedback corresponding to the comment feedback addition request may be pushed to each terminal; and if the valid user identifier list does not include the target user identifier, it is considered that the verification fails, that is, the comment feedback corresponding to the comment feedback addition request cannot be displayed on the terminal.

In step 230, the comment push information is sent to at least one terminal that currently opens the target document.

In an embodiment, the step in which the comment push information is sent to the at least one terminal that currently opens the target document may include that the at least one terminal that currently opens the target document is determined, and at least one communication link identifier that matches the at least one terminal respectively is acquired; and the comment push information is sent to a corresponding terminal respectively through a communication link corresponding to the at least one communication link identifier.

In the embodiment of the present disclosure, after the server determines that the comment feedback addition request passes the verification and generates the comment push information matching the comment feedback addition request, in order that all terminals that open the target document are enabled to update the feedback of the target comment in the target document and the users can view the comment feedback at the same time, firstly, the at least one terminal that currently opens the target document is determined according to the target document identifier, and the comment push information is sent to the corresponding terminal respectively through the communication link corresponding to the at least one terminal so that the terminal can display the comment feedback corresponding to the comment push information on the page of the target document.

In an embodiment, after the comment push information is sent to the at least one terminal that currently opens the target document, the method may further include that the comment push information is stored in a database; and after the comment push information is stored in the database, the method may further include that in response to a communication establishment request carrying the target document identifier sent by a new terminal, a target communication link is established with the new terminal; the comment push information matching the target document identifier is acquired from the database; and the comment push information is sent to the new terminal through the target communication link.

In the embodiment of the present disclosure, after the comment push information is sent to the terminal that currently opens the target document, the comment push information may be stored in the database so that when other terminals open the target document subsequently, the comment push information may be sent to other terminals.

In an embodiment, when the server receives the communication establishment request carrying the target document identifier sent by the new terminal, the server first establishes the target communication link with the new terminal for transmitting data with the new terminal, then acquires the comment push information matching the target document identifier from the database, and sends the comment push information to the new terminal through the target communication link so that the new terminal updates the comment feedback of the target document of the new terminal, and the user can acquire the latest comment feedback content.

In the embodiment of the present disclosure, the comment feedback addition request sent by the terminal is acquired, and the comment feedback addition request is generated according to the selection of the target comment impression option in the at least two candidate comment impression options displayed in the terminal; if it is determined that the comment feedback addition request passes the verification, the comment push information matching the comment feedback addition request is generated and sent to the at least one terminal that currently opens the target document so that the terminal displays the comment feedback on the page of the target document, the comments in the online document are fed back, the problem in which the user cannot quickly determine which comment information is a useful comment or which comment information is a useless comment and cannot accurately and quickly screen out high-quality comment content from a large amount of comment information is solved, the feedback content of the comment is sent to each opened online document page in real time, communication and feedback between the users are enhanced, and at the same time, the user may quickly and effectively screen out the comments.

Embodiment Three

Figure 3A:
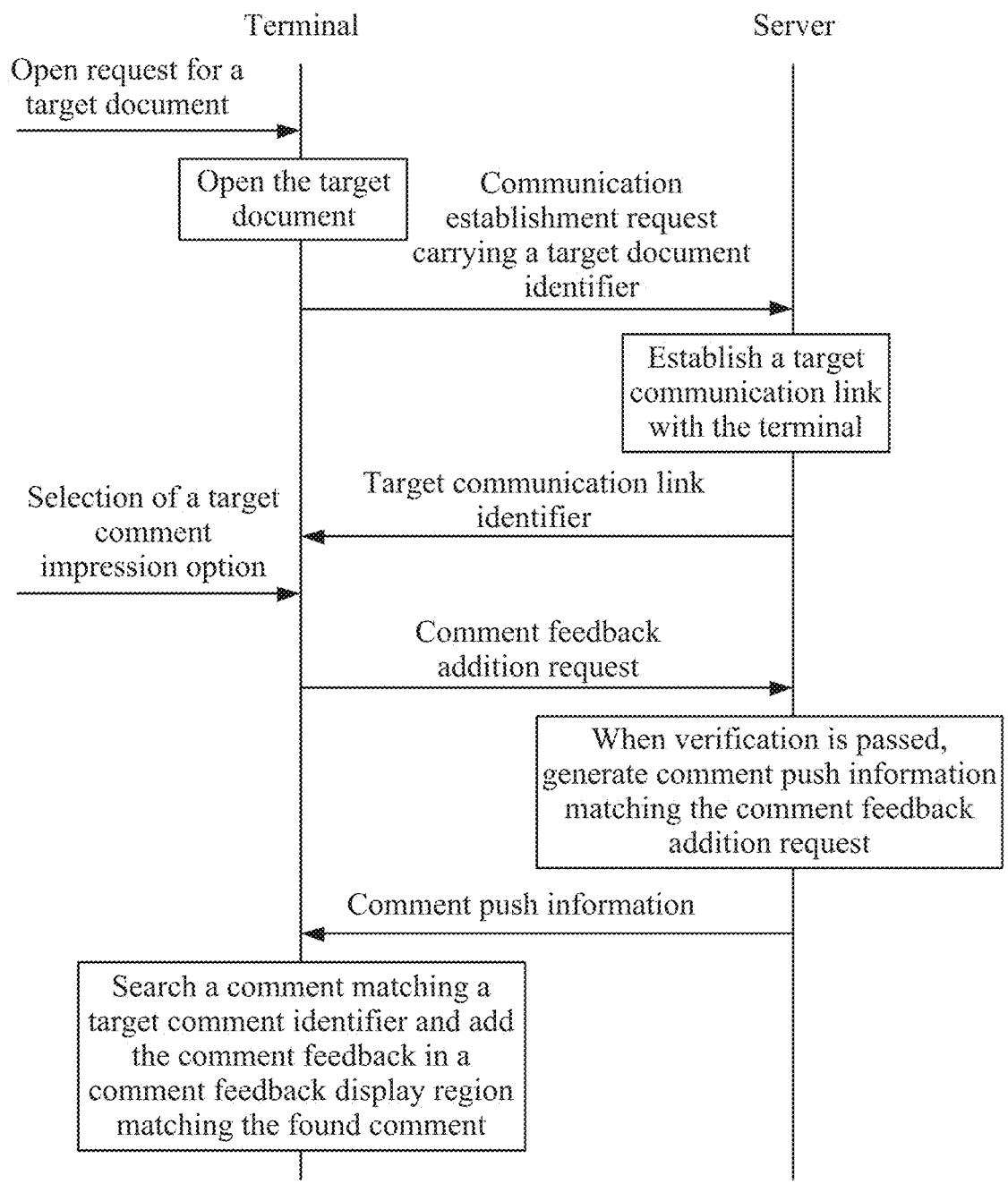
FIG. 3A is a flowchart of an implementation of an application scenario according to embodiment three of the present disclosure.

FIG. 3A is a flowchart of an implementation of an application scenario according to embodiment three of the present disclosure. The embodiment of the present disclosure may be combined with optional schemes in the preceding embodiments. As shown in FIG. 3A, the method may include steps described below.

First, a terminal opens a target document in response to an open request for the target document and sends a communication establishment request carrying a target document identifier to a server.

In an embodiment, when a user double-clicks on the target document to open the document, the terminal generates the open request for the target document, opens the target document according to the request, and displays the content of the document. After the document is opened, the terminal sends the communication establishment request carrying the target document identifier to the server to establish a communication link with the server, facilitating subsequent information exchange with the server.

In an embodiment, after the terminal opens the target document, in response to a comment addition request of the user for the target document, the terminal acquires the content of a target comment inputted by the user, generates a record request corresponding to the target comment, and sends the record request to the server so that the server stores information such as the target document identifier, a user identifier, a target comment identifier and the content of the target comment included in the record request.

Next, the server establishes a target communication link with the terminal and sends a target communication link identifier corresponding to the target communication link to the terminal.

In the embodiment of the present disclosure, each communication link identifier uniquely identifies one communication link, and through the target communication link identifier, the server may push specified information to a specified terminal.

In an embodiment, after the server establishes the target communication link with the terminal, in order that the terminal is enabled to update the feedback of each comment in the target document and the user can acquire the latest comment feedback content, the server acquires the comment push information matching the target document identifier from a database, and sends the comment push information to the terminal through the target communication link.

Next, in response to the selection of a target comment impression option, the terminal generates comment feedback addition request matching the target comment impression option and sends the comment feedback addition request to the server.

In the embodiment of the present disclosure, when the user clicks on a feedback button corresponding to the target comment in the target document, the terminal may display to the user at least two preset candidate comment impression options, such as the "like" emoticon, the "applause" emoticon, the "disagreeing" picture and the "invaluable advice" text. When the user clicks on a corresponding candidate comment impression option, the terminal may generate a comment feedback addition request matching the comment impression option and sends the comment feedback addition request to the server so that the server performs corresponding feedback permission verification on the comment feedback addition request. The comment feedback addition request includes a target document identifier, a target comment identifier, a target user identifier, and a target comment feedback type.

Next, the server performs permission verification on the comment feedback addition request, and when the verification is passed, the server generates comment push information matching the comment feedback addition request and sends the comment push information to the terminal that currently opens the target document.

In an embodiment, the server first acquires a valid user identifier list corresponding to the target comment identifier in the comment feedback addition request, and then compares the target user identifier in the comment feedback addition request with the valid user identifier list. If the valid user identifier list includes the target user identifier, it is considered that the verification is passed, and if the valid user identifier list does not include the target user identifier, it is considered that the verification fails.

If the verification is passed, the server generates the comment push information matching the comment feedback addition request, determines at least one terminal that currently opens the target document according to the target document identifier, and then sends the comment push information to a corresponding terminal through a communication link corresponding to the at least one terminal respectively so that the terminal may display the comment feedback corresponding to the comment push information on the page of the target document.

Figure 3B:
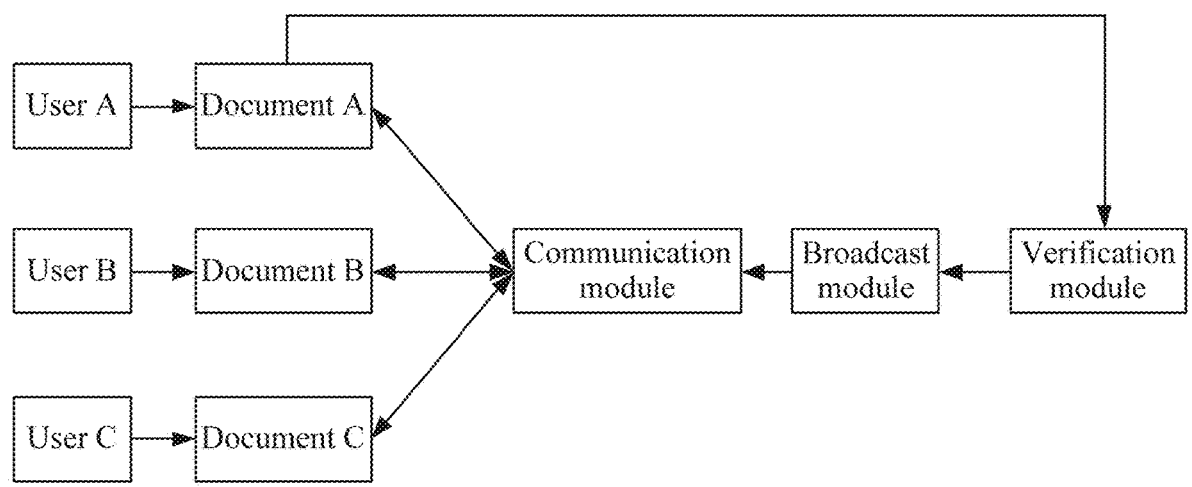
FIG. 3B is a structural diagram illustrating a function of a server according to embodiment three of the present disclosure.

In the embodiment of the present disclosure, as shown in FIG. 3B, the server may be divided into a verification module, a broadcast module and a communication module according to functions. The verification module may be configured to receive the comment feedback addition request and verify whether the target user has the comment feedback permission; if the verification is passed, generate the comment push information matching the comment feedback addition request, store the comment push information in the database, and send the comment push information to the broadcast module; and if the verification fails, return a verification result to the terminal that sends the comment feedback addition request. The broadcast module may be configured to push the received comment push information to the communication module. The communication module may be configured to acquire all terminals that open the target document according to the target document identifier in the comment push information and then push the comment push information to the corresponding terminal.

Next, the terminal acquires a document matching the target document identifier in at least one currently opened document and searches the acquired document for a comment matching the target comment identifier.

In the embodiment of the present disclosure, after receiving the comment push information, the terminal determines whether the document matching the target document identifier in the comment push information exists in at least one currently opened document, and if not, the terminal directly performs the returning; and if so, the terminal continuously searches the matched document for the comment matching the target comment identifier.

Finally, the terminal adds the comment feedback in a comment feedback display region matching the found comment.

Figure 3C:
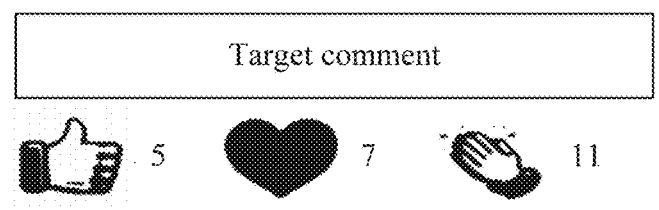
FIG. 3C is a schematic diagram of a display result of comment feedback according to embodiment three of the present disclosure.

In the embodiment of the present disclosure, if the terminal finds that no comment matching the target comment identifier exists in the terminal, the terminal does not proceed to a next step; and if the terminal finds that the comment matching the target comment identifier exists in the terminal, the terminal acquires a comment impression option corresponding to the target comment feedback type and adds the comment impression option in the comment feedback display region matching the found comment as shown in FIG. 3C.

Embodiment Four

Figure 4:
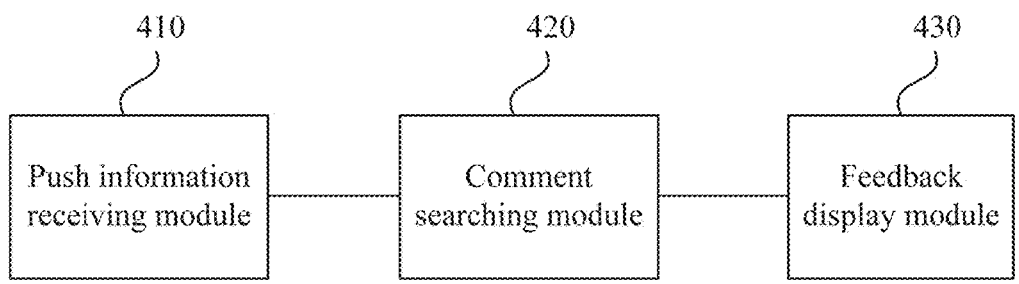
FIG. 4 is a structural diagram of a feedback apparatus based on an online document comment according to embodiment four of the present disclosure.

FIG. 4 is a structural diagram of a feedback apparatus based on an online document comment according to embodiment four of the present disclosure. The embodiment of the present disclosure may be applicable to the case of performing feedback on a target comment on a target document and displaying feedback content. The apparatus may be implemented by software and/or hardware and may be configured in an electronic device such as a terminal device. As shown in FIG. 4, the apparatus may include a push information receiving module 410, a comment searching module 420, and a feedback display module 430.

The push information receiving module 410 is configured to receive comment push information sent by a server, where the comment push information is generated by the server according to a comment feedback addition request sent by any terminal and includes a document identifier, a comment identifier, and a comment feedback type. The comment searching module 420 is configured to determine a first target document matching the document identifier and search the acquired first target document for a first comment matching the comment identifier. The feedback display module 430 is configured to acquire comment feedback matching the comment feedback type and add the comment feedback in a comment feedback display region matching the first comment.

In the embodiment of the present disclosure, the comment push information sent by the server is received, the first target document and the first comment matching the comment push information are determined, and the comment feedback matching the comment feedback type in the comment push information is added in the comment feedback display region matching the first comment. In this manner, the comment in an online document is fed back, and the problem in which the user cannot accurately and quickly screen out comment content that the user really wants to read from a large amount of comment information is solved; and the feedback content for the comment is sent to each opened online document page in real time so that communication and feedback between the users are enhanced, and at the same time, the user may quickly and effectively screen out the comments.

The comment feedback display region is located at a preset position in a first comment region of the first comment or located at a preset position outside the first comment region.

The apparatus further includes a comment generation module configured to, after the comment feedback is added in the comment feedback display region matching the first comment, in response to a comment request of a user, generate a second comment, where the second comment and the first comment correspond to a same commented content; and a second comment region where the second comment is located and the comment feedback display region are located in different regions.

The second comment region where the second comment is located and the comment feedback display region being located in different regions includes that the comment feedback display region is located between the first comment region and the second comment region; or the second comment region is immediately adjacent to one side of the first comment region, and the comment feedback display region is immediately adjacent to another side of the first comment region.

The apparatus further includes a feedback addition request module configured to, in response to a comment impression feedback request for a third comment in a second target document, generate a comment feedback addition request corresponding to a preset comment feedback and send the comment feedback addition request to the server; or display at least two candidate comment impression options in response to the comment impression feedback request for the third comment in the second target document; and in response to a selection of a target comment impression option, generate a comment feedback addition request matching the target comment impression option and send the comment feedback addition request to the server; where the server is configured to generate comment push information according to the comment feedback addition request and send the comment push information to at least one terminal that opens the second target document.

The feedback addition request module further includes a communication establishment unit configured to, before the at least two candidate comment impression options are displayed in response to the comment impression feedback request for the third comment in the second target document, open the second target document in response to an open request for the second target document; and send a communication establishment request carrying a second target document identifier to the server to establish a target communication link with the server, and receive a target communication link identifier corresponding to the second target document identifier returned by the server.

The feedback addition request module is configured to send the comment feedback addition request to the server through a communication link corresponding to the target communication link identifier.

The comment feedback type matches a type of the candidate comment impression options.

The feedback display module 430 is configured to acquire the comment feedback type and determine whether comment feedback of this type exists in the comment feedback display region; if the comment feedback of this type exists in the comment feedback display region, update a number of pieces of comment feedback in the comment feedback display region; and if the comment feedback of this type does not exist in the comment feedback display region, add the comment feedback in the comment feedback display region.

The comment feedback is an emoticon icon and/or an emoticon icon and a name of a commenter.

The feedback apparatus based on an online document comment provided in embodiments of the present disclosure belongs to a same disclosed concept as the feedback method based on an online document comment provided in the embodiments of the present disclosure. For technical details not described in detail in the embodiments of the present disclosure, reference may be made to the preceding embodiments. In addition, the feedback apparatus based on an online document comment in the embodiments of the present disclosure has the same effect as the feedback method based on an online document comment provided in the preceding embodiments.

Embodiment Five

Figure 5:
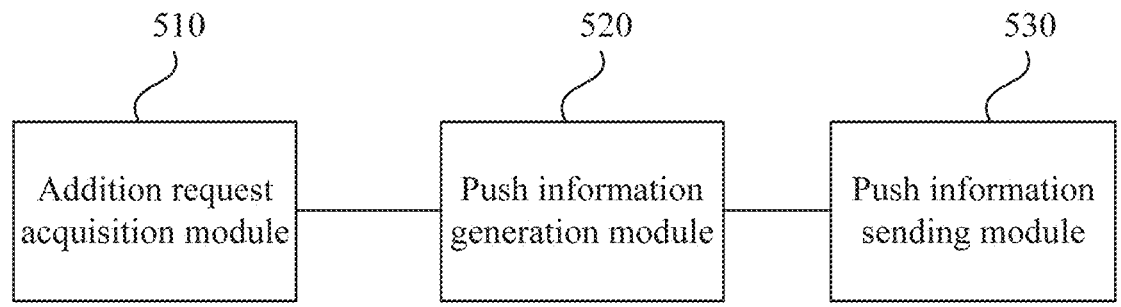
FIG. 5 is a structural diagram of a feedback apparatus based on an online document comment according to embodiment five of the present disclosure.

FIG. 5 is a structural diagram of a feedback apparatus based on an online document comment according to embodiment five of the present disclosure. The embodiment of the present disclosure may be applicable to the case of performing verification on a target comment feedback of a target document sent by a terminal and pushing the feedback content that passes verification to all terminals that open the target document. The apparatus may be implemented by software and/or hardware and may be configured in an electronic device such as a server. As shown in FIG. 5, the apparatus may include an addition request acquisition module 510, a push information generation module 520 and a push information sending module 530.

The addition request acquisition module 510 is configured to acquire a comment feedback addition request sent by a terminal, where the comment feedback addition request is generated according to a selection of a target comment impression option in at least two candidate comment impression options displayed in the terminal. The push information generation module 520 is configured to, if it is determined that the comment feedback addition request passes the verification, generate comment push information matching the comment feedback addition request, where the comment push information includes a document identifier, a comment identifier, and a comment feedback type. The push information sending module 530 is configured to send the comment push information to at least one terminal that currently opens a target document.

In the embodiment of the present disclosure, the comment feedback addition request sent by the terminal is acquired, and the comment feedback addition request is generated according to the selection of the target comment impression option in the at least two candidate comment impression options displayed in the terminal; if it is determined that the comment feedback addition request passes the verification, the comment push information matching the comment feedback addition request is generated and sent to the at least one terminal that currently opens the target document so that the terminal displays the comment feedback on the page of the target document, the comments in the online document are fed back, the problem in which the user cannot accurately and quickly screen out comment content that the user really wants to read from a large amount of comment information is solved, the feedback content of the comment is sent to multiple opened online document page in real time, communication and feedback between the users are enhanced, and at the same time, the user may quickly and effectively screen out the comments.

The addition request acquisition module 510 further includes a communication unit configured to, before the comment feedback addition request sent by the terminal is acquired, receive a communication establishment request carrying the document identifier sent by the terminal; establish a target communication link with the terminal according to the communication establishment request; and send a target communication link identifier corresponding to the target communication link to the terminal.

The addition request acquisition module 510 is configured to acquire the comment feedback addition request sent by the terminal through the target communication link.

The push information generation module 520 is configured to compare a target user identifier in the comment feedback addition request with a valid user identifier list; and if the valid user identifier list includes the target user identifier, the verification is passed, and if the valid user identifier list does not include the target user identifier, the verification fails.

The push information sending module 530 is configured to determine at least one terminal that currently opens the target document and acquire at least one communication link identifier matching the at least one terminal respectively, and send the comment push information to a corresponding terminal respectively through a communication link corresponding to the at least one communication link identifier.

The feedback apparatus based on an online document comment further includes a storage module configured to store the comment push information in a database after the comment push information is sent to at least one terminal that currently opens the target document.

The push information sending module 530 is configured to, after the comment push information is stored in the database, in response to a communication establishment request carrying the target document identifier sent by a new terminal, establish a target communication link with the new terminal; acquire the comment push information matching the target document identifier from the database; and send the comment push information to the new terminal through the target communication link.

The feedback apparatus based on an online document comment provided in embodiments of the present disclosure belongs to a same disclosed concept as the feedback method based on an online document comment provided in the embodiments of the present disclosure. For technical details not described in detail in the embodiments of the present disclosure, reference may be made to the preceding embodiments. In addition, the feedback apparatus based on an online document comment in the embodiments of the present disclosure has the same effect as the feedback method based on an online document comment provided in the preceding embodiments.

Embodiment Six

Figure 6:
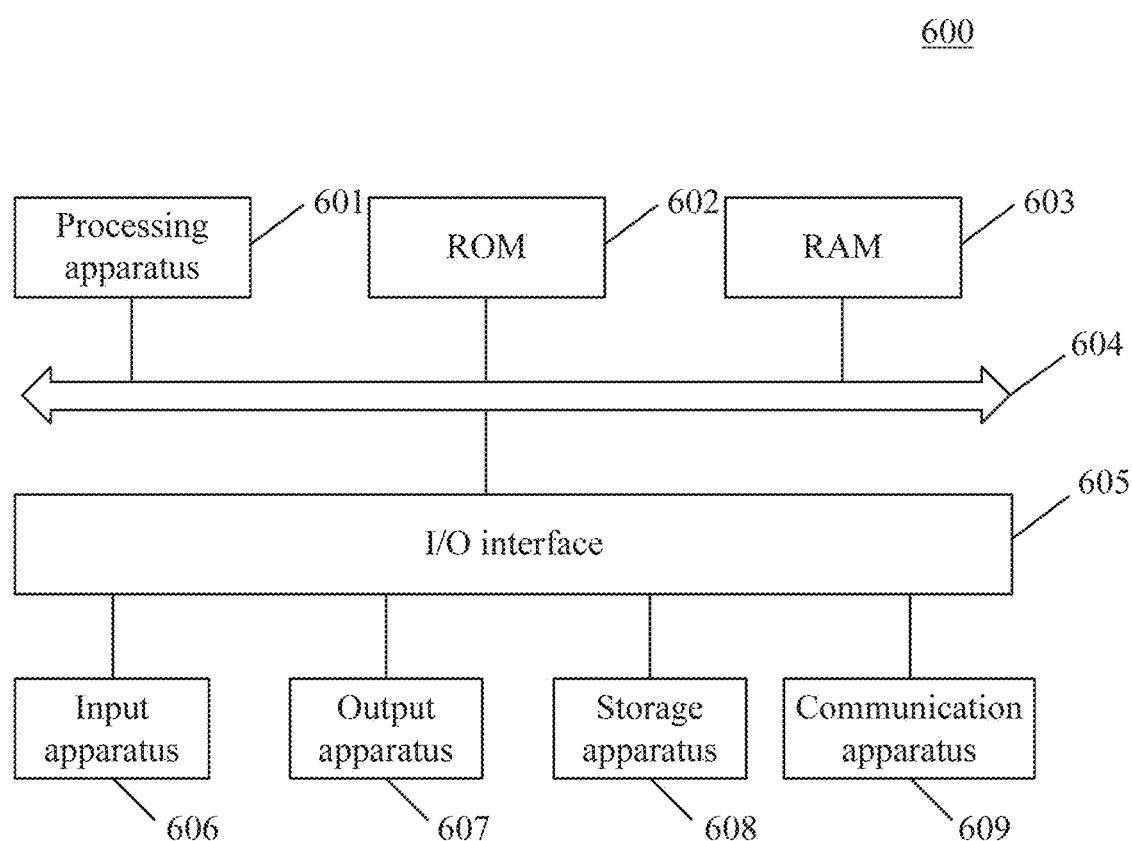
FIG. 6 is a structural diagram of an electronic device according to embodiment six of the present disclosure.

The embodiment of the present disclosure provides an electronic device. With reference to FIG. 6, FIG. 6 is a structural diagram of a device (for example, a terminal device or a server) 600 applicable to implementing the embodiments of the present disclosure. The device in the embodiment of the present disclosure may include, but is not limited to, a mobile terminal such as a mobile phone, a laptop, a digital broadcast receiver, a personal digital assistant (PDA), a portable Android device (PAD), a portable media player (PMP) and an in-vehicle terminal (such as an in-vehicle navigation terminal) and a stationary terminal such as a digital television (TV) and a desktop computer. The device shown in FIG. 6 is merely an example and should not impose any limitation to the function and usage scope of the embodiment of the present disclosure.

As shown in FIG. 6, the electronic device 600 may include a processing apparatus (such as a central processing unit and a graphics processing unit) 601. The processing apparatus 601 may execute, according to a program stored in a read-only memory (ROM) 602 or a program loaded into a random-access memory (RAM) 603 from a storage apparatus 608, multiple appropriate actions and processing. The RAM 603 also stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 such as a touch screen, a touch pad, a keyboard, a mouse, a camera, a microphone, an accelerometer, and a gyroscope; an output apparatus 607 such as a liquid crystal display (LCD), a speaker, and a vibrator; the storage apparatus 608 such as a magnetic tape and a hard disk; and a communication apparatus 609. The communication apparatus 609 may allow the electronic device 600 to perform wireless or wired communication with other devices to exchange data. Although FIG. 6 shows the electronic device 600 having various apparatuses, it is not required to implement or be equipped with all the shown apparatuses. Alternatively, more or fewer apparatuses may be implemented or present.

According to the embodiments of the present disclosure, the process described above with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the feedback method based on an online document comment in the embodiments of the present disclosure are executed.

Embodiment Seven

Embodiments of the present disclosure further provide a computer-readable storage medium. A computer-readable medium may be a computer-readable signal medium, or a computer-readable storage medium or any combination of the two. The computer-readable storage medium may be, but not limited to, an electrical, magnetic, optical, electromagnetic, infrared, or semiconductor system, apparatus, or device, or any combination thereof. An example of the computer-readable storage medium may include, but not limited to, an electrical connection having one or more wires, a portable computer magnetic disk, a hard disk, an RAM, an ROM, an erasable programmable read-only memory (EPROM), a flash memory, an optical fiber, a portable compact disc read-only memory (CD-ROM), an optical storage device, a magnetic storage device, or any suitable combination thereof.

In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

The computer-readable medium may be included in the device or may exist alone without being assembled into the device.

The computer-readable medium carries one or more programs. When executed by the device, the one or more programs cause the device to: receive comment push information sent by a server, where the comment push information is generated by the server according to a comment feedback addition request sent by any terminal and includes a document identifier, a comment identifier, and a comment feedback type; determine a first target document matching the document identifier and search the first target document for a first comment matching the comment identifier; and acquire comment feedback matching the comment feedback type and add the comment feedback in a comment feedback display region matching the first comment.

Alternatively, when executed by the electronic device, the one or more programs cause the electronic device to: acquire a comment feedback addition request sent by a terminal, where the comment feedback addition request is generated according to a selection of a target comment impression option in at least two candidate comment impression options displayed in the terminal; if it is determined that the comment feedback addition request passes verification, generate comment push information matching the comment feedback addition request, where the comment push information includes a document identifier, a comment identifier, and a comment feedback type; and send the comment push information to at least one terminal that currently opens a target document.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions and operations of the system, method and computer program product according to a plurality of embodiments of the present disclosure. In this regard, each block in a flowchart or block diagram may represent a module, a program segment, or part of codes that contains one or more executable instructions for implementing specified logical functions. In some alternative implementations, the functions marked in the blocks may occur in an order different from that marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a unit is not intended to limit the unit in a certain circumstance, for example, the comment searching module may also be described as "a module configured to determine a first target document matching the document identifier and search the acquired first target document for a first comment matching the comment identifier".

In addition, although the operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in a plurality of embodiments, individually or in any suitable sub-combination.

Although the subject matter is described in the language specific to structural features and/or methodological logic acts, it is to be understood that the subject matter defined in the present disclosure is not necessarily limited to the specific features or acts described above. Conversely, the specific features and acts described above are merely example forms of implementing the present disclosure.

What is claimed is:

1. A feedback method based on an online document comment, applied to a terminal and comprising:
receiving comment push information sent by a server, wherein the comment push information is generated by the server according to a comment feedback addition request sent by a terminal and comprises a document identifier, a comment identifier, and a comment feedback type;

determining a first target document matching the document identifier and determining a first comment matching the comment identifier in the first target document; and acquiring comment feedback on the first comment matching the comment feedback type and adding the comment feedback on the first comment in a comment feedback display region matching the first comment, wherein the comment feedback display region is located at a preset position inside a first comment region of the first comment, and the comment feedback is an emoticon icon, or an emoticon icon and a name of a commenters;

wherein the adding the comment feedback on the first comment in the comment feedback display region matching the first comment comprises:

acquiring the comment feedback type which is selected from multiple comment feedback types by a user, wherein the multiple comment feedback types comprise emoticon types corresponding to various preset emoticons and pictures respectively, and determining whether comment feedback of a same type as the comment feedback type selected from the emoticon types by the user exists in the comment feedback display region; and in response to the comment feedback of the same type as the comment feedback type selected from the emoticon types by the user existing in the comment feedback display region, updating a number of pieces of the comment feedback of the same type as the comment feedback type selected from the emoticon types by the user in the comment feedback display region; and in response to the comment feedback of the same type as the comment feedback type selected from the emoticon types by the user not existing in the comment feedback display region, adding the comment feedback selected from the emoticon types by the user into the comment feedback display region, wherein the comment feedback type selected from the emoticon types by the user refers to an emoticon type selected from the emoticon types by the user which corresponds to the emoticon icon.

2. The method of claim 1, after adding the comment feedback on the first comment in the comment feedback display region matching the first comment, the method further comprising:

in response to a comment request of a user, generating a second comment, wherein the second comment and the first comment correspond to a same commented content; and a second comment region where the second comment is located and the comment feedback display region are located in different regions.

3. The method of claim 2, wherein the second comment region where the second comment is located and the comment feedback display region being located in the different regions comprises:

the comment feedback display region is located between the first comment region and the second comment region; or the second comment region is adjacent to one side of the first comment region, and the comment feedback display region is adjacent to another side of the first comment region.

4. The method of claim 1, further comprising:
in response to a comment impression feedback request for a third comment in a second target document, generating a comment feedback addition request corresponding to a preset comment feedback and sending the comment feedback addition request corresponding to the preset comment feedback to the server; or displaying at least two candidate comment impression options in response to a comment impression feedback request for a third comment in a second target document; and in response to a selection of a target comment impression option in the at least two candidate comment impression options, generating a comment feedback addition request matching the target comment impression option and sending the comment feedback addition request matching the target comment impression option to the server;

wherein the server is configured to generate comment push information according to the comment feedback addition request and send the comment push information to at least one terminal that opens the second target document.

5. The method of claim 4, before displaying the at least two candidate comment impression options in response to the comment impression feedback request for the third comment in the second target document, the method further comprising:

opening the second target document in response to an open request for the second target document; and sending a communication establishment request carrying a second target document identifier to the server to establish a target communication link with the server, and receiving a target communication link identifier corresponding to the second target document identifier returned by the server;

wherein generating the comment feedback addition request matching the target comment impression option and sending the comment feedback addition request matching the target comment impression option to the server comprises:

sending the comment feedback addition request matching the target comment impression option to the server through a communication link corresponding to the target communication link identifier.

6. The method of claim 4, wherein the comment feedback type matches a type of one candidate comment impression option of the at least two candidate comment impression options.

7. A non-transitory computer-readable storage medium storing a computer program, wherein the computer program, when executed by a processor, performs the feedback method based on an online document comment of claim 1.

8. A feedback method based on an online document comment, applied to a server and comprising:

acquiring a comment feedback addition request sent by a terminal, wherein the comment feedback addition request is generated according to a selection of a target comment impression option in at least two candidate comment impression options displayed in the terminal;

in a case where it is determined that the comment feedback addition request passes verification, generating comment push information matching the comment feedback addition request, wherein the comment push information comprises a document identifier, a comment identifier, and a comment feedback type; and sending the comment push information to at least one terminal that opens a target document matching the document identifier, so that the at least one terminal adds comment feedback on a first comment in a comment feedback display region matching the first comment in the target document, wherein the comment feedback display region is located at a preset position inside a first comment region of the first comment, and the comment feedback is an emoticon icon, or an emoticon icon and a name of a commenter;

wherein the at least one terminal adds the comment feedback on the first comment in the comment feedback display region matching the first comment in the target document comprises:

acquiring the comment feedback type which is selected from multiple comment feedback types by a user, wherein the multiple comment feedback types comprise emoticon types corresponding to various preset emoticons and pictures respectively, and determining whether comment feedback of a same type as the comment feedback type selected from the emoticon types by the user exists in the comment feedback display region; and in response to the comment feedback of the same type as the comment feedback type selected from the emoticon types by the user existing in the comment feedback display region, updating a number of pieces of the comment feedback of the same type as the comment feedback type selected from the emoticon types by the user in the comment feedback display region; and in response to the comment feedback of the same type as the comment feedback type selected from the emoticon types by the user not existing in the comment feedback display region, adding the comment feedback selected from the emoticon types by the user into the comment feedback display region, wherein the comment feedback type selected from the emoticon types by the user refers to an emoticon type selected from the emoticon types by the user which corresponds to the emoticon icon.

9. The method of claim 8, before acquiring the comment feedback addition request sent by the terminal, further comprising:

receiving a communication establishment request carrying the document identifier sent by the terminal;

establishing a target communication link with the terminal according to the communication establishment request; and sending a target communication link identifier corresponding to the target communication link to the terminal;

wherein acquiring the comment feedback addition request sent by the terminal comprises:

acquiring the comment feedback addition request sent by the terminal through a communication link corresponding to the target communication link identifier.

10. The method of claim 9, wherein sending the comment push information to the at least one terminal that opens the target document matching the document identifier comprises:

determining the at least one terminal that opens the target document, and acquiring at least one communication link identifier that matches the at least one terminal respectively; and sending the comment push information to each of the at least one terminal through a respective one of at least one communication link corresponding to the at least one communication link identifier.

11. The method of claim 9, after sending the comment push information to the at least one terminal that opens the target document matching the document identifier, the method further comprising:

storing the comment push information in a database;

in response to a communication establishment request carrying the document identifier sent by a new terminal, establishing a target communication link with the new terminal;

acquiring the comment push information matching the document identifier from the database; and sending the comment push information to the new terminal through the target communication link.

12. The method of claim 8, wherein it being determined that the comment feedback addition request passes the verification comprises:

comparing a target user identifier in the comment feedback addition request with a valid user identifier list; and in a case where the valid user identifier list comprises the target user identifier, determining that the comment feedback addition request passes the verification, and in a case where the valid user identifier list does not comprise the target user identifier, determining that the verification fails.

13. A feedback apparatus based on an online document comment, applied to a server and comprising: at least one processor; and a memory configured to store at least one program, wherein the at least one program, when executed by the at least one processor, causes the at least one processor to perform the feedback method based on an online document comment of claim 8.

14. A non-transitory computer-readable storage medium storing a computer program, wherein the computer program, when executed by a processor, performs the feedback method based on an online document comment of claim 8.

15. A feedback apparatus based on an online document comment, applied to a terminal and comprising:

at least one processor; and a memory configured to store at least one program, wherein the at least one program, when executed by the at least one processor, causes the at least one processor to perform:

receiving comment push information sent by a server, wherein the comment push information is generated by the server according to a comment feedback addition request sent by a terminal and comprises a document identifier, a comment identifier, and a comment feedback type;

determining a first target document matching the document identifier and determining a first comment matching the comment identifier in the first target document; and acquiring comment feedback on the first comment matching the comment feedback type and add the comment feedback on the first comment in a comment feedback display region matching the first comment, wherein the comment feedback display region is located at a preset position inside a first comment region of the first comment, and the comment feedback is an emoticon icon, or an emoticon icon and a name of a commenter;

wherein the adding the comment feedback on the first comment in the comment feedback display region matching the first comment comprises:

acquiring the comment feedback type which is selected from multiple comment feedback types by a user, wherein the multiple comment feedback types comprise emoticon types corresponding to various preset emoticons and pictures respectively, and determining whether comment feedback of a same type as the comment feedback type selected from the emoticon types by the user exists in the comment feedback display region; and in response to the comment feedback of the same type as the comment feedback type selected from the emoticon types by the user existing in the comment feedback display region, updating a number of pieces of the comment feedback of the same type as the comment feedback type selected from the emoticon types by the user in the comment feedback display region; and in response to the comment feedback of the same type as the comment feedback type selected from the emoticon types by the user not existing in the comment feedback display region, adding the comment feedback selected from the emoticon types by the user into the comment feedback display region, wherein the comment feedback type selected from the emoticon types by the user refers to an emoticon type selected from the emoticon types by the user which corresponds to the emoticon icon.

16. The apparatus of claim 15, wherein after adding the comment feedback on the first comment in the comment feedback display region matching the first comment, the at least one program, when executed by the at least one processor, causes the at least one processor to further perform:

in response to a comment request of a user, generating a second comment, wherein the second comment and the first comment correspond to a same commented content; and a second comment region where the second comment is located and the comment feedback display region are located in different regions.

* * * * *